United States Patent Office 3,579,555
Patented May 18, 1971

3,579,555
CHROME COMPLEXES OF SUBSTITUTED BENZOIC ACID
William J. Pangonis, West Chester, Pa., assignor to E. I. du Pont de Nemours and Company, Wilmington, Del.
No Drawing. Filed Feb. 3, 1969, Ser. No. 796,224
Int. Cl. C07f 11/00; C23c 3/00
U.S. Cl. 260—438.5                                     3 Claims

ABSTRACT OF THE DISCLOSURE

This invention relates to novel chrome complexes of benzoic acid. These complexes are exemplified by p-sulfamylbenzoic acid chrome complex and p-acetamidobenzoic acid chrome complex.

BACKGROUND OF THE INVENTION

Various substituted benzoic acid chromium complexes are known to the art and these complexes have been used as antistatic coatings for a variety of films. Such complexes may be prepared in the manner described in U.S. Pats. 2,273,040; 2,356,161 and 2,524,803. These complexes vary to a great degree in their antistatic performance when coated upon films. Also, while they generally exhibited beneficial reduction in antistatic properties of a film, coatings of these compositions often detrimentally effect the adhesion of other coatings to the treated film.

SUMMARY OF THE INVENTION

Novel benzoic acid chromium complexes have been prepared which are extremely useful as film coating agents to give a reduction in antistatic properties while allowing adhesion between the coated film and subsequently coated layers. The chromium complexes of this invention have the following structure:

A—NH—B where A is H—,

or $R_1$—$SO_2$—, R is —H, —$CH_3$, or —$C_2H_5$, $R_1$ is —$CH_3$ or —$C_2H_5$ and B is (1)

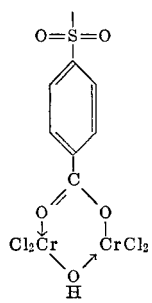

or (2)

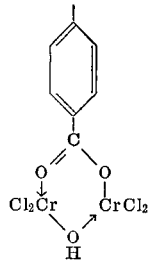

with the proviso that if A is hydrogen, B must be Formula 1.

GENERAL DESCRIPTION OF THE INVENTION

The chrome complexes of this invention can be prepared from basic chromic chloride. The basic chromic chloride can be prepared as described in U.S. Pat. 2,683,156. In this preparation chromium trioxide with hydrogen chloride and sulfuric acid are reacted to yield anhydrous chromyl chloride. This in turn is reacted with a lower monohydric aliphatic alcohol to give the basic chromic chloride.

The basic chromic chloride is dissolved in a lower aliphatic alcohol such as isopropanol and then mixed with the selected benzoic acid such as p-sulfamylbenzoic acid or p-acetamidobenzoic acid. This mixture is then heated to reflux for a short period of time and the mixture upon cooling contains the desired chromium complex.

The chromium complexes of this invention can be utilized as coating compositions when admixed with a suitable volatile solvent or when mixed with other coating compositions. Suitable volatile solvents are those which would not affect the complex such as methanol, ethanol, isopropanol, butanol and aqueous solutions of these alcohols. These complexes may be coated onto films in very dilute solution. While optimum concentrations may be determined for a particular film, coatings of these chrome complexes on polyester film sheets have shown beneficial results with solutions containing 1 part of chromium complex per 100 parts of solvent to 1 part of complex per 1,000 parts of solvent. The resulting dried films will generally have a complex coating thickness which give about 4 to 25 milligrams of chromium per 1000 square inches of film area. Usually 5 to 10 milligrams of chromium per 1000 square inches is very adequate.

The chrome complex solutions may be beneficially applied to films prepared from polyesters, polypropylene, polyimide, polyethylene, polyvinylchloride and polyvinylchloride/polyvinylidene chloride films. The effects of the complex coatings on each film will naturally vary with the type of film being coated. The preferred film being polyester film.

These novel chrome complexes are outstanding as coating compositions for films since they simultaneously impart several beneficial results to the films. Thus improvements can be noted in reduction of antistatic properties of the film, improved wettability of the film, and improved adhesion of subsequent coatings when the film is treated with these chrome complexes.

The chrome complexes of this invention are prepared from selected benzoic acids such as p-sulfamylbenzoic acid, p-(formylsulfamyl)benzoic acid, p-(acetylsulfamyl) benzoic acid, p - (propionylsulfamyl)benzoic acid, p- (methanesulfonylsulfamyl)benzoic acid, p - (ethanesulfonylsulfamyl)benzoic acid, p-formamidobenzoic acid, p-acetamidobenzoic acid, p-propionamidobenzoic acid, p- (methanesulfonamido)benzoic acid and p-(ethanesulfonamido)benzoic acid.

It is believed that the unique activity of the subject chrome complexes is as a result of the highly acidic nitrogen atom found in the complex. The resonance structures of the chrome complexes cause the electron density on the nitrogen to decrease which makes the nitrogen more positive or acidic. This nitrogen will in turn enhance the wettability of the film to which the complex is applied. This allows the films whch are generally hydrophilic to be more easily wet or coated. The chrome complexes of p-sulfamylbenzoic and p-acetamidobenzoic acids can also be used as coupling agents between thermosetting resins and glass and thermoplastics and glass.

Example 1

296 grams of basic chrome chloride solution containing 8.77% Cr is prepared according to the procedure described in U.S. Pat. No. 2,683,156, and is dissolved in 88 grams of isopropanol. Fifty grams of p-sulfamylbenzoic acid is added to the basic chrome chloride solution. The reactants are heated to reflux for 16 minutes and allowed to cool. The resulting solution contains a chrome complex of p-sulfamylbenzoic acid with a 2/1 Cr/acid mole ratio and 6% Cr.

Example 2

264 grams of basic chrome chloride solution containing 8.77% Cr is prepared according to the procedure described in U.S. Pat. No. 2,683,156 and is dissolved in 83 grams of isopropyl alcohol. Forty grams of p-acetamidobenzoic acid is added to the basic chrome chloride solution. The reactants are heated to reflux for 16 minutes and allowed to cool. The resulting solution contains a chrome complex of p-acetamidobenzoic acid with a 2/1 Cr/acid mole ratio and 6% Cr.

Example 3

A polyester film is coated with varying quantities of chrome complexes of p-sulfamylbenzoic acid (PSB) and p-acetamidobenzoic acid (PAB). A third compound p-nitrobenzoic acid (PNB) which is not within the scope of this invention is also included. The coating weight is determined by the milligrams of chromium per 1000 sq. inches of film surface. The surface resistivity naturally varies with the coating thickness, but for a given thickness the complexes of this invention give superior results. The surface resistivity is measured by ASTM method D–257–61.

| Coating in mg. of Cr/1,000 sq. in.. | 23 | 13 | 5 | 0.75 |
|---|---|---|---|---|
| PSB | $9\times10^9$ | $2\times10^9$ | $5\times10^{11}$ | $7\times10^{14}$ |
| PAB | $5\times10^9$ | $4\times10^9$ | $8\times10^{11}$ | $6\times10^{14}$ |
| PNB | $14\times10^9$ | $3\times10^{10}$ | $2\times10^{13}$ | $5\times10^{15}$ |

Note.—Test values given in ohms per square from the ASTM method.

Example 4

A thin (~1μ) coating of aluminum is vacuum deposited on a polyester film to be tested. An eight mil gray vinyl film is laminated to the aluminum with a polyvinylidine chloride adhesive. Samples slit into one inch widths are inserted in a Suter tester and the force required to effect peel is measured. Since the adhesion of the gray vinyl is so great, peel is effected at the polyester film-aluminum interface. Bond strengths in lbs./in. width are given below. Coating thicknesses for the chromium complexes of the coated control film are in each case 4–6 mg. Cr/1000 in.$^2$. Each value is an average of 10 samples. Coated samples 5–11 are not within the scope of the invention but provide a basis for comparison.

Lbs./in. width
(1) Flame treated polyester film _____ 2.3
(2) Control polyester film _____ 1.4
(3) p-Sulfamylbenzoic coated control film _____ 2.4
(4) p-Acetamidobenzoic coated control film _____ 2.3
(5) Acetyl glycine coated control film _____ 2.2
(6) p-Nitrobenzoic coated control film _____ 1.7
(7) Amino acetic coated control film _____ 1.9
(8) Trichloroacetic coated control film _____ 1.8
(9) Aminobenzoic coated control film _____ 1.8
(10) Thioglycolic coated control film _____ 1.9
(11) Sulfoacetic coated control film _____ 2.0

What is claimed is:

1. A chrome complex comprising the following formula:

A—NH—B where A is H—,

or $R_1$—$SO_2$—, R is —H, —$CH_3$, or —$C_2H_5$, $R_1$ is —$CH_3$ or —$C_2H_5$
and B is (1)

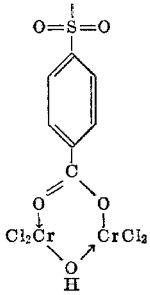

or (2)

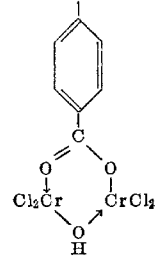

with the proviso that if A is hydrogen, B must be Formula 1.

2. A compound of claim 1 where said chrome complex is p-sulfamylbenzoic acid.

3. A compound of claim 1 where said chrome complex is p-acetamidobenzoic acid.

References Cited

UNITED STATES PATENTS 2,825,659   3/1958   Dalton et al. _____ 260—438C

TOBIAS E. LEVOW, Primary Examiner

H. M. SNEED, Assistant Examiner

U.S. Cl. X.R.

117—121